(12) United States Patent
Bui Tran et al.

(10) Patent No.: US 10,733,479 B2
(45) Date of Patent: Aug. 4, 2020

(54) SYSTEM AND METHOD FOR PROVIDING A RECIPE

(71) Applicant: BSH HAUSGERAETE GMBH, Munich (DE)

(72) Inventors: Duc Hanh Bui Tran, Munich (DE); Thomas Garbe, Ottobrunn (DE); Wesley De Goei, Oostzaan (NL)

(73) Assignee: BSH Hausgeraete GmbH, Munich (DE)

( * ) Notice: Subject to any disclaimer, the term of this patent is extended or adjusted under 35 U.S.C. 154(b) by 191 days.

(21) Appl. No.: 15/746,027

(22) PCT Filed: Jul. 14, 2016

(86) PCT No.: PCT/EP2016/066748
§ 371 (c)(1),
(2) Date: Jan. 19, 2018

(87) PCT Pub. No.: WO2017/016886
PCT Pub. Date: Feb. 2, 2017

(65) Prior Publication Data
US 2018/0211139 A1 Jul. 26, 2018

(30) Foreign Application Priority Data
Jul. 24, 2015 (DE) .......... 10 2015 214 060

(51) Int. Cl.
*G06K 9/62* (2006.01)
*G06K 9/00* (2006.01)
(52) U.S. Cl.
CPC .......... *G06K 9/6267* (2013.01); *G06K 9/00* (2013.01); *G06K 9/6217* (2013.01); *G06K 2209/17* (2013.01)

(58) Field of Classification Search
CPC ...... G06K 9/00; G06K 9/6267; G06K 9/6217; G06K 2209/17
See application file for complete search history.

(56) References Cited

U.S. PATENT DOCUMENTS

| | | | |
|---|---|---|---|
| 10,402,980 B2 * | 9/2019 | Mutti | G06K 9/00214 |
| 2010/0111383 A1 * | 5/2010 | Boushey | G06K 9/00 382/128 |

(Continued)

FOREIGN PATENT DOCUMENTS

| | | | | |
|---|---|---|---|---|
| JP | 2010061382 A | * | 3/2010 | |
| JP | 2018084884 A | * | 5/2018 | |
| WO | WO-2017135742 A1 | * | 8/2017 | G06N 3/08 |

OTHER PUBLICATIONS

Erik Sofge, "Google's A.I. Is Training Itself to Count Calories in Food Photos", May 29, 2015.

*Primary Examiner* — Pinalben Patel
(74) *Attorney, Agent, or Firm* — Laurence A. Greenberg; Werner H. Stemer; Ralph E. Locher

(57) ABSTRACT

A method for identifying a recipe for food which has already been prepared includes identifying image data which shows the food that has already been prepared. A recipe is identified on the basis of the image data. The identification of the recipe includes identifying a food candidate which corresponds to a specific probability of the food that has already been prepared on the basis of the image data and identifying a recipe for preparing the food candidate. The identified recipe indicates a multiplicity of ingredients for preparing the food candidate and process steps of a method for preparing the food candidate from the multiplicity of ingredients. A system for identifying a recipe for an already produced food is also provided.

14 Claims, 1 Drawing Sheet

(56) References Cited

U.S. PATENT DOCUMENTS

| | | | |
|---|---|---|---|
| 2014/0104385 A1* | 4/2014 | Wong | G06Q 10/10 348/46 |
| 2015/0170001 A1* | 6/2015 | Rabinovich | G06K 9/66 382/110 |
| 2015/0228062 A1* | 8/2015 | Joshi | G06F 16/583 382/110 |
| 2016/0150213 A1* | 5/2016 | Mutti | G01N 33/02 348/143 |
| 2017/0220558 A1* | 8/2017 | Pinel | G06F 40/295 |
| 2018/0157936 A1* | 6/2018 | Lee | G06K 9/00671 |
| 2018/0211139 A1* | 7/2018 | Bui Tran | G06K 9/00 |
| 2018/0308143 A1* | 10/2018 | Chan | G06Q 30/06 |
| 2019/0000382 A1* | 1/2019 | Fitzpatrick | A61B 5/681 |
| 2019/0035159 A1* | 1/2019 | Tran | G06F 3/013 |
| 2020/0005455 A1* | 1/2020 | Alshurafa | G01N 21/27 |

* cited by examiner

SYSTEM AND METHOD FOR PROVIDING A RECIPE

BACKGROUND OF THE INVENTION

Field of the Invention

The invention relates to a method (in particular a method implemented by means of a computer) and a corresponding system for identifying a recipe.

There are instances, particularly on holiday, when people eat already prepared food that is unknown to them.

In the document by Erik Sofge, "Google's AI is training itself to count calories in food photos", dated 29 May 2015 and published in the blog posci.com, an artificial intelligence system is described that determines the energy content (calories) of a combination of foods shown in an image. However the described system does not allow a user to produce an unknown, already prepared food themselves in an efficient and reliable manner.

The present document therefore deals with the technical object of recognizing an unknown food in an efficient and reliable manner and identifying a recipe with ingredients and production steps for the unknown food.

SUMMARY OF THE INVENTION

The object is achieved by the subject matter of the independent claims. Advantageous and optional embodiments are described inter alia in the dependent claims and description which follows and illustrated in the accompanying drawing. Advantageous and optional manifestations of the method here correspond to advantageous and optional manifestations of the system and vice versa, even if this is not expressly stated herein.

According to one aspect a method is described for identifying a recipe for an already produced or prepared food. The method can be executed by a processor, for example the processor of an electronic device, for example a smartphone or computer. The already produced food here typically comprises a plurality of different ingredients, which are processed during the course of a production process, to produce the food. During the course of the production process the food can be cooked, in particular boiled, roasted, grilled and/or baked.

The recipe to be identified can show a plurality of ingredients for producing a food, as well as details of quantities for the plurality of ingredients. The recipe to be identified can also show process steps of a production process for the food. The recipe to be identified here should correspond with the greatest possible probability to the recipe used to produce the already produced food.

The method comprises identifying image data that shows the already produced food. The (in particular digital) image data can be identified from a photograph of the already produced food. In particular the image data can comprise individual image points or pixels of a photograph of the food.

The method also comprises identifying a recipe as a function of the image data. Evaluating image data that shows the already produced food allows efficient identification of a recipe or recipe suggestion that has been used with a specific probability to produce the already produced food. A relevance value for the identified recipe can optionally be identified and shown, in order to show the user the probability of the identified recipe having been used to produce the already produced food.

Identifying a recipe can comprise identifying (at least) one food candidate based on the image data. In other words the image data can be used to determine a food candidate, which corresponds with a specific probability to the already produced food. In particular the food candidate that corresponds with the relatively greatest probability (compared with the other candidates of a plurality of food candidates) to the already produced food can be identified from the plurality of (optionally predetermined) food candidates. The recipe supplied to a user as a possible recipe for the already produced food can then be a recipe for producing the food candidate. This recipe can be taken from a recipe database for example, the recipe database comprising a corresponding plurality of recipes for a plurality of food candidates. By identifying a food candidate it is possible to identify the most probable or relevant recipe possible for the already produced food in a robust manner.

The method can comprise identifying a plurality of food candidates. A corresponding plurality of relevance values can also be identified for the plurality of food candidates. The relevance value of a food candidate here can show the probability that the food candidate corresponds to the already produced food. A plurality of recipes can also be identified for the plurality of food candidates (for example by accessing the recipe database). A plurality of possible recipes can then be supplied (and optionally shown) for the already produced food. The plurality of recipes here can be supplied as a function of the corresponding plurality of relevance values (for example listed by decreasing relevance value). Identifying a plurality of possible recipes can further improve the robustness of recipe identification.

Identifying a food candidate can comprise analysis of the image data, in order to identify a manifestation of at least one image data feature of the food. The image data features can comprise for example color, texture, size, consistency and/or shape of the food (or a specific food component) shown in the image data. The manifestations of a plurality of image data features are typically identified and combined in a feature vector.

A food candidate can then be identified as a function of the manifestation of the at least one image data feature (or of the feature vector). This allows robust identification of a probable food candidate for the already produced food.

In particular identifying a food candidate can comprise identifying an allocation function, which is designed to allocate different food candidates to different manifestations of the at least one image data feature (or of a feature vector). The allocation function can comprise for example a cluster algorithm, a support vector machine and/or a neural network. The allocation function can also be learned based on training data, the training data typically showing a corresponding plurality of actual manifestations of the at least one image data feature (or of the feature vector) for a plurality of actual foods. The food candidate can then be identified as a function of or using the allocation function. A learned allocation function allows robust identification of a probable food candidate for the already produced food.

The method can also comprise identifying a response or feedback relating to the identified recipe. The feedback indicates the extent to which the identified recipe matches the food shown in the image data. In particular the feedback can show a user's estimation of whether or not the recipe was used to produce the already produced food. The allocation function can then be adjusted as a function of the feedback. This further improves the recognition rate for recipes.

The method can also comprise identifying metadata for the image data. The metadata here can comprise location information indicating the location where the image data was acquired. Alternatively or additionally the metadata can comprise time information indicating the time point when the image data was acquired. The recipe can then also be identified as a function of the metadata. Taking into account metadata allows the recognition rate for recipes to be further improved. In particular possible food candidates can be preselected based on the metadata to reduce the number of possible food candidates to those food candidates that could generally be relevant in light of the metadata.

The metadata can be taken into account in particular by selecting the allocation function used for identifying one or more food candidates from a plurality of allocation functions as a function of the metadata. For example different allocation functions can be supplied for different locations (for example countries, regions, cities, optionally restaurants).

Alternatively or additionally the metadata can be taken into account by identifying a manifestation of at least one metadata feature based on the metadata. The at least one metadata feature can be part of a feature vector, which comprises one or more image data features and one or more metadata features. The allocation function can then be designed to allocate different food candidates to different combinations of manifestations of the at least one image data feature and manifestations of the at least one metadata feature.

The already produced food can comprise a plurality of food components, which were produced separately (for example a meat component and/or a side component). A plurality of subsets of the image data can then be identified for the corresponding plurality of food components based on the image data. This can be done using image analysis methods (in particular based on segmentation methods). A plurality of recipes for the corresponding plurality of food components can also be identified according to the method described in the present document based on the plurality of subsets of the image data. This allows suitable recipes to be identified even for complex dishes.

The method can further comprise identifying ambient information relating to the surroundings of the already produced food based on the image data. The ambient information can show for example the flatware and/or tableware used for the already produced food. The ambient information can thus provide information for example relating to the consistency and/or origin of the already produced food. The recipe can then be identified as a function of the ambient information. This can further improve the recognition rate for a recipe.

According to a further aspect a system is described for identifying a recipe for an already prepared food. This system is designed to identify image data that shows the already produced food. The system is further designed to identify a recipe, in particular a recipe suggestion for the already produced food, as a function of the image data.

According to a further aspect a software (SW) program is described. The SW program can be designed to be executed on a processor and thereby to execute the method described in the present document.

According to a further aspect a storage medium is described. The storage medium can comprise an SW program, which is designed to be executed on a processor and thereby to execute the method described in the present document.

It should be noted that the methods, apparatuses and systems described in the present document can be used both alone and in combination with other methods, apparatuses and systems described in the present document. Also all aspects of the methods, apparatus and systems described in the present document can be combined in many different ways. In particular the features of the claims can be combined in many different ways.

BRIEF DESCRIPTION OF THE SEVERAL VIEWS OF THE DRAWING

The invention is described in more detail below with reference to exemplary embodiments illustrated in the accompanying drawing, in which.

DESCRIPTION OF THE INVENTION

Figure 1:
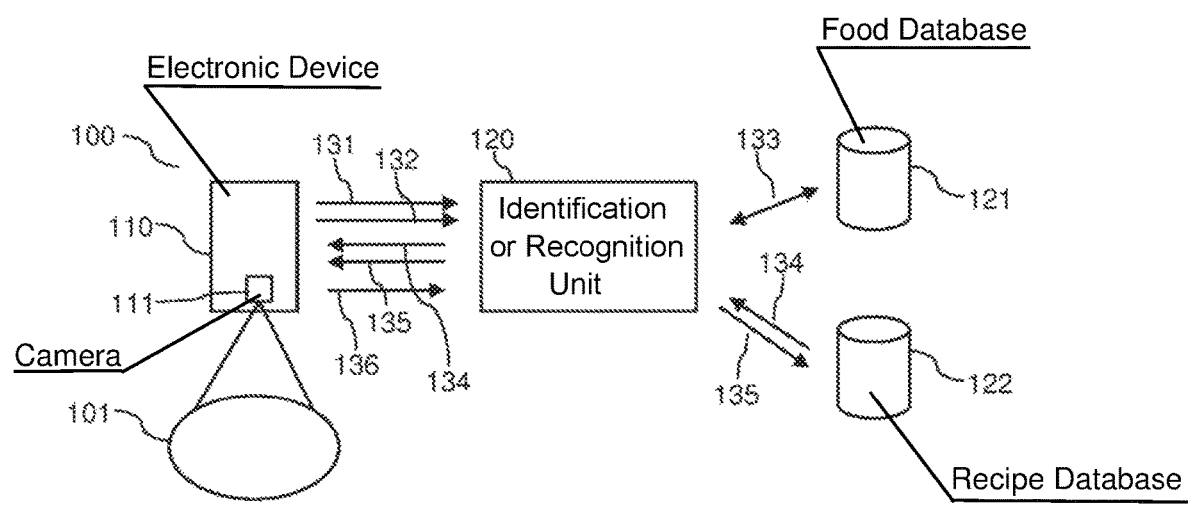
FIG. 1 shows a block diagram of an exemplary system for identifying a recipe for producing a food.

As set out in the introduction, the present document deals with the recognition of an unknown food and the identification of a recipe for such a food. FIG. 1 shows a block diagram of an exemplary system 100 for identifying a recipe for a food 101. The food 101 typically comprises a plurality of different ingredients. The food 101 can also be cooked (for example boiled, roasted, baked, grilled, etc.). The recipe to be identified comprises a list of the ingredients of the food 101 (and corresponding details of quantities). The recipe to be identified also comprises a list of process steps of a production process for the food 101. A user of the system 100 is enabled to produce the previously unknown food 101 by the identified recipe.

The system 100 comprises an electronic device 110 (for example a smartphone of a user), which is designed to identify image data relating to the unknown, already produced food 101. To this end the electronic device 110 can comprise a camera 111, which is designed to acquire an image (and corresponding image data) of the food 101.

In addition to the image data the electronic device 110 can identify metadata that shows further information relating to the image data. The metadata can comprise one or more of the following information types:
  Location information (e.g. GPS coordinates) that show the location (for example the country or region or restaurant) where the image data was acquired; and/or
  Time information (e.g. a local time) that shows the time point (e.g. the local time) when the image data was acquired.

The image data 131 and optionally the metadata 132 can be transmitted to a recognition unit 120 (for example by way of a suitable wireless or wired communication connection). The recognition unit 120 is designed to identify one or more food candidates, to which the food 101 shown in the image data 131 could correspond, based on the image data 131 and optionally based on the metadata 132. To this end the recognition unit 120 can access an allocation function, which is designed to allocate different food candidates to different manifestations of a feature vector. The allocation function can comprise for example a cluster algorithm, a support vector machine and/or a neural network.

In particular the recognition unit 120 can be designed to determine a manifestation of a feature vector for the food 101 to be identified based on the image data 131 and optionally based on the metadata 132. A feature vector can comprise a plurality of vector dimensions, a vector dimension being able to describe a specific feature of the food 101.

Exemplary features of the food 101 or of individual components of the food 101 are: color, structure, consistency, size, etc. The manifestations of such features can be identified based on the image data 131 (for example using image analysis methods). This produces a feature vector, which describes features or properties (also referred to as image data features in the present document) of the food 101 to be identified that can be acquired pictorially.

The metadata 132 can be identified to identify manifestations of further features of the feature vector (referred to as metadata features in the present document). Exemplary features that can be identified based on the metadata 132 are the location and/or time, where/when the food 101 to be recognized was consumed. Alternatively or additionally different allocation functions can be used as a function of the metadata 132 in order to identify the one or more food candidates. Taking into account metadata 132 allows the quality (in particular the relevance) of the one or more food candidates identified to be improved.

The allocation function 133 can be drawn from a local and/or remote food database 121. A remote food database 121 can be accessed by way of the Internet. The identification unit 120 can use an (optionally metadata-dependent) allocation function 133 to identify a list of one or more food candidates 135, which could be relevant for the identified manifestation of the feature vector. Probabilities and/or relevance values can also be identified for the one or more food candidates 135. The one or more food candidates 135 with the relatively highest probability/relevance can thus be selected. The user can also be supplied with a list of one or more food candidates 135 optionally sorted by relevance. To this end the list of one or more food candidates 135 can be transmitted to the electronic device 110 of the user.

The identification unit 120 is further designed to identify at least one recipe 134 for each of the one or more food candidates 135. To this end the identification unit 120 can access a local or remote recipe database 122, which supplies at least one recipe 134 for a food candidate 135. A remote recipe database 122 can be accessed by way of the Internet. The identified recipes 134 for the one or more food candidates 135 can be transmitted to and optionally displayed on the electronic device 135 of the user.

The identification unit 120 can be designed to adjust the identification of food candidates 135 and/or recipes 134 as a function of feedback 136 from the user. In particular an allocation function 133 can be adjusted as a function of feedback 136. For example the feedback 136 can show which candidate 135 the user selected as correct from the identified food candidates 135. This information can then be used in the context of a machine learning method to adjust the allocation function 133 for identifying the food candidates 135. The system 100 can thus be continuously improved.

The system 100 is therefore designed to recognize a food 101 (in particular a dish) automatically based on a photograph. The photograph can be available physically or digitally and can be supplied in the form of suitable (digital) image data 131 for an image analysis. The system 100 supplies the user with suitable suggestions for recipes 134 (optionally with probability details for the individual suggestions) based on the image data 131. A food 101 can then be recognized not only using image recognition and image processing but also by including metadata 132 and optionally other data sources (for example country-specific exclusion criteria, national dishes, etc., can be taken into account based on the location information). The system 100 can be implemented in the manner of an application for a smartphone, a plug-in in a browser, etc.

Recognition of a food 101 can be learning-capable (for example by connection to an expert system that is learning-capable, such as the Watson system from IBM). This allows the recognition function of the system 100 to be improved automatically through use of the system 100.

In one example the photograph of the food 101 is available digitally (for example in an image collection or in a social medium, such as Facebook, Instagram, etc.) as image data 131. There is also access to metadata 132, for example GPS data, time stamps, image description, etc. The system 100 can perform prefiltering based on the metadata 132 in order to limit the list of possible food candidates. For example the GPS data indicates the country (e.g. India) where the photograph was taken. This allows improbable ingredients for said country (for example beef) to be excluded. The location information can also be used optionally to identify a restaurant, where the photograph was taken. A menu of said restaurant available online allows the list of possible food candidates to be limited further. If the date a photograph was taken is known, alignment can optionally be performed with a digital calendar of the user who took the photograph to identify where said user was when the photograph was taken. This information can then be used again to limit the list of possible food candidates.

After identifying a limited list of possible food candidates, a list of (for example three) food candidates 135, which have a relatively highest relevance value or match factor, can optionally be identified by processing the image data 131. Recipes 134 that are suitable for these can also be identified and supplied to the user.

The user can select one of the recipes 134 shown and optionally give feedback 136 (in other words a response) about the correctness of an identified recipe 134. The feedback 136 can be used to improve recognition of food candidates 135 and/or recipes 134. The feedback 136 expands the training data for learning an expert system and/or an allocation function 133, thereby improving the recognition rate of the system 100.

Information can also optionally be supplied by way of a photograph of a food 101 based on external information sources without metadata 132 or in addition to metadata 132. One example of such an information source is a digital calendar of a user of the system 100, from which it is possible to identify the typical whereabouts of said user. The typical whereabouts can be used to limit the list of possible food candidates.

During the processing of the image data 131 it is possible also optionally to identify manifestations of features relating to the surroundings (in other words ambient information). For example the type of flatware (e.g. knife and fork or chopsticks) used to eat the food 101 can be identified. This information can be used to reduce the list of possible food candidates further.

As shown in FIG. 1, the system 100 can access a plurality of databases 121, 122 (optionally by way of the Internet). Information relating to recipes, country-specific properties, images of dishes, etc. can be identified by way of the databases 121, 122.

Figure 2:
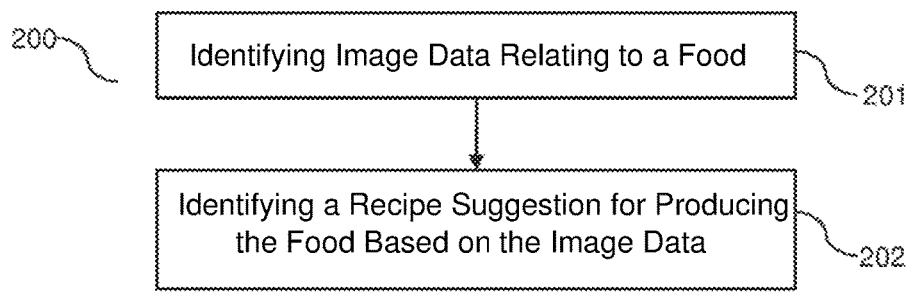
FIG. 2 shows a flow diagram of an exemplary method for identifying a recipe for producing a food.

FIG. 2 shows a flow diagram of an exemplary method 200 for identifying a recipe 134 for an already produced food 101 (for example for baked goods, for a cooked dish and/or for a salad). The method 200 comprises identifying 201 image data 131 showing the already produced food 101. In particular a photograph of the food 101 can be supplied. The digital data of the photograph can correspond to the image data 131.

The method 200 further comprises identifying 202 a recipe 134 as a function of the image data 131. In particular a recipe 134, which was used with a specific probability to produce the already produced food 101, can be identified. Information relating to the probability or the relevance of the identified recipe 134 can also optionally be supplied. As set out in the present document, the image data 131 can be analyzed in order to identify one or more image data features, from which one or more food candidates 135 can then be identified by means of a learned allocation function 133. Recipes 134 for the one or more food candidates 135 can then be identified and supplied as possible recipes 134 for the already produced food 101 (for example by accessing a recipe database 122).

The method 200 and/or system 100 described in the present document allow(s) a user to identify a recipe for already produced food 101 in an efficient manner. The user is enabled to produce themselves and/or share with others a food 101 that is unknown to them.

The present invention is not restricted to the illustrated exemplary embodiments. In particular it should be noted that the description and figures are only intended to illustrate the principle of the proposed methods, apparatuses and systems.

The invention claimed is:

1. A computer-implemented method for identifying a recipe for an already produced food, the method comprising the following steps:
   identifying image data showing the already produced food;
   identifying a recipe as a function of the image data;
   carrying out the step of identifying the recipe by identifying a food candidate corresponding, with a specific probability, to the already produced food based on the image data and identifying the recipe for producing the food candidate;
   using the recipe to indicate a plurality of ingredients for producing the food candidate and process steps of a method for producing the food candidate from the plurality of ingredients;
   carrying out the step of identifying the food candidate by identifying an allocation function configured to allocate different food candidates to different manifestations of at least one image data feature of the food, and identifying the food candidate as a function of the allocation function;
   identifying feedback relating to the identified recipe, wherein the feedback shows a user's estimation of whether or not the recipe was used to produce the already produced food;
   using the feedback to indicate an extent to which the identified recipe matches food shown in the image data; and
   adjusting the allocation function as a function of the feedback.

2. The method according to claim 1, which further comprises:
   identifying a plurality of food candidates;
   identifying a plurality of relevance values for the plurality of food candidates, and using the relevance value of a food candidate to indicate a probability with which the food candidate corresponds to the already produced food;
   identifying a plurality of recipes for the plurality of food candidates; and
   supplying the plurality of recipes as a function of the corresponding plurality of relevance values.

3. The method according to claim 1, which further comprises:
   carrying out the step of identifying a food candidate by analyzing the image data in order to identify a manifestation of at least one image data feature of the food; and
   identifying the food candidate as a function of the manifestation of the at least one image data feature.

4. The method according to claim 3, which further comprises providing the image data features as at least one of color, texture, size, consistency or shape of the food shown in the image data.

5. The method according to claim 4, which further comprises:
   identifying metadata for the image data and providing the metadata with at least one of:
      location information indicating a location where the image data was acquired, or
      time information indicating a point in time when the image data was acquired;
   additionally identifying the recipe as a function of the metadata; and
   at least one of:
      selecting an allocation function from a plurality of allocation functions as a function of the metadata, or
      identifying a manifestation of at least one metadata feature based on the metadata, and configuring the allocation function to allocate different food candidates to different combinations of manifestations of the at least one image data feature and manifestations of the at least one metadata feature.

6. The method according to claim 1, which further comprises at least one of:
   providing the allocation function as at least one of a cluster algorithm, a support vector machine or a neural network; or
   learning the allocation function based on training data indicating a corresponding plurality of actual manifestations of the at least one image data feature for a plurality of actual foods.

7. The method according to claim 1, which further comprises:
   identifying metadata for the image data;
   providing the metadata with at least one of:
      location information indicating a location where the image data was acquired, or
      time information indicating a point in time when the image data was acquired; and
   additionally identifying the recipe as a function of the metadata.

8. The method according to claim 1, which further comprises:
   providing the already produced food as a plurality of food components having been produced separately;
   identifying a plurality of subsets of the image data for the corresponding plurality of food components based on the image data; and
   identifying a plurality of recipes for the plurality of food components, based on the plurality of subsets of the image data.

9. The method according to claim 1, which further comprises:

identifying ambient information relating to surroundings of the already produced food based on the image data;
using the ambient information to show at least one of flatware or tableware used for the already produced food; and
identifying the recipe as a function of the ambient information.

10. The method according to claim 1, which further comprises at least one of:
providing the already produced food from a plurality of different ingredients; or
cooking the already produced food by boiling, roasting, grilling or baking.

11. The method according to claim 1, which further comprises using the identified recipe to indicate details of quantities for the plurality of ingredients.

12. The method according to claim 1, which further comprises providing the allocation function as a neural network.

13. The non-transitory computer readable medium according to claim 12, wherein the allocation function is implemented as a neural network.

14. A non-transitory computer readable medium having stored thereon a set of computer readable instructions for performing a computer-implemented method for identifying a recipe for an already produced food, the method comprising the following steps:

identifying image data showing the already produced food;
identifying a recipe as a function of the image data;
carrying out the step of identifying the recipe by identifying a food candidate corresponding, with a specific probability, to the already produced food based on the image data and identifying the recipe for producing the food candidate;
using the recipe to indicate a plurality of ingredients for producing the food candidate and process steps of a method for producing the food candidate from the plurality of ingredients;
carrying out the step of identifying the food candidate by identifying an allocation function configured to allocate different food candidates to different manifestations of at least one image data feature of the food, and identifying the food candidate as a function of the allocation function;
identifying feedback relating to the identified recipe, wherein the feedback shows a user's estimation of whether or not the recipe was used to produce the already produced food;
using the feedback to indicate an extent to which the identified recipe matches food shown in the image data; and
adjusting the allocation function as a function of the feedback.

* * * * *